July 17, 1962  B. H. SAGE  3,044,858
CALCIUM CARBIDE PROCESS
Filed Dec. 16, 1957  2 Sheets-Sheet 1
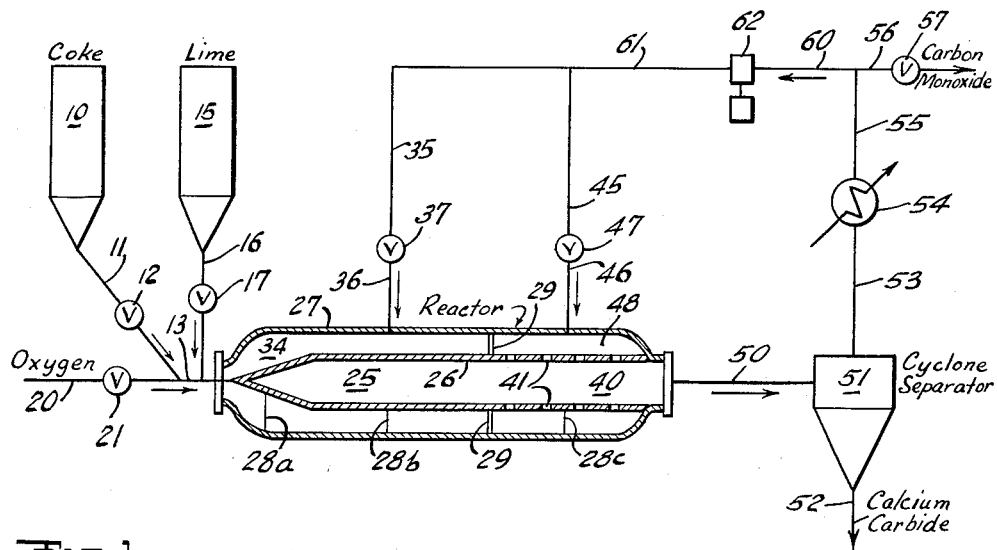
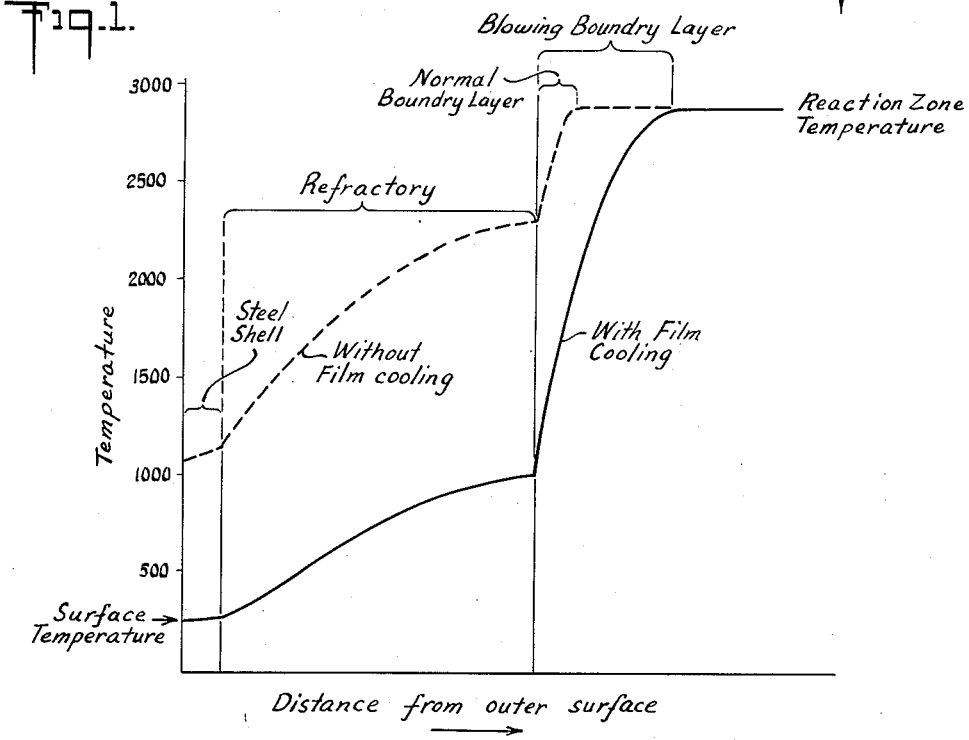

July 17, 1962  B. H. SAGE  3,044,858
CALCIUM CARBIDE PROCESS
Filed Dec. 16, 1957  2 Sheets-Sheet 2
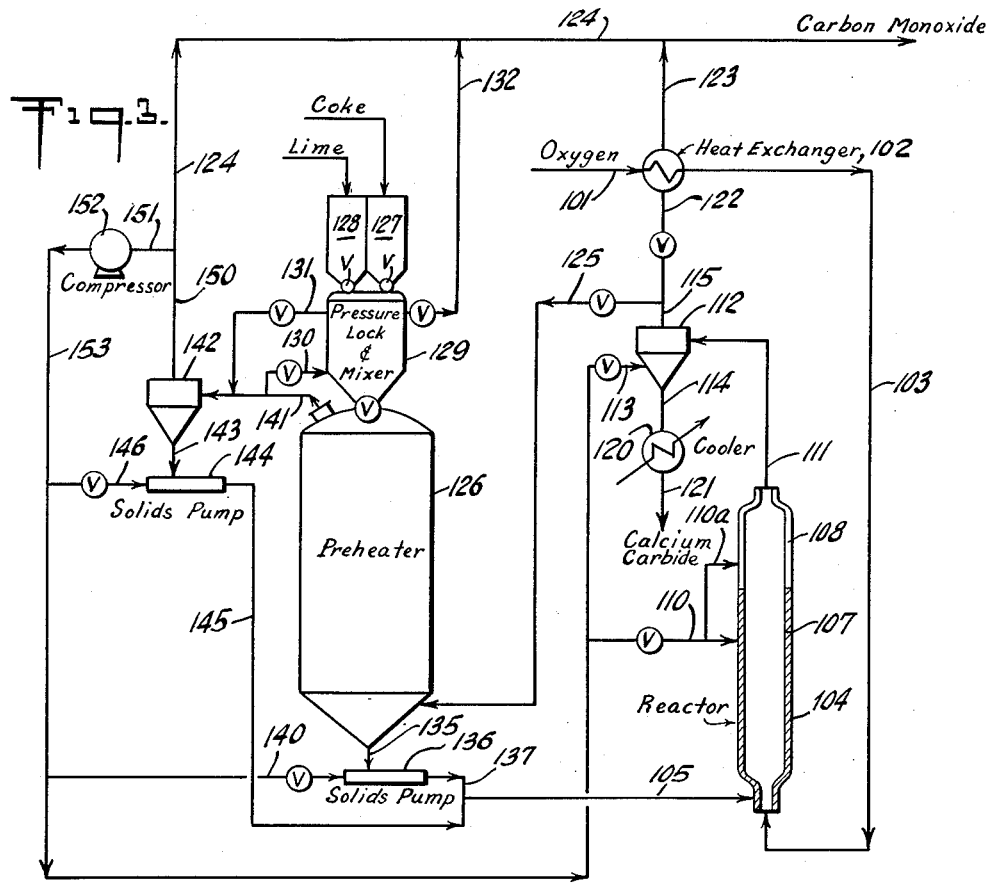
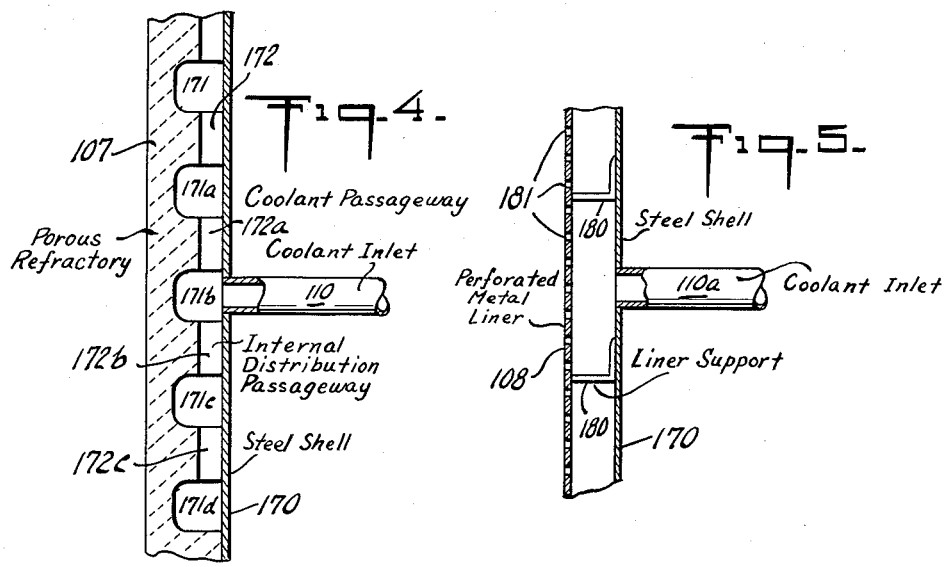

3,044,858
CALCIUM CARBIDE PROCESS
Bruce H. Sage, Altadena, Calif., assignor to Texaco Inc., a corporation of Delaware
Filed Dec. 16, 1957, Ser. No. 705,080
3 Claims. (Cl. 23—208)

This invention relates to a method and apparatus for the manufacture of calcium carbide. In one of its more specific aspects it is directed to a process wherein a calcareous solid and a carbonaceous solid suspended in oxygen in the form of a gaseous dispersion of solids are reacted at an autogenous temperature within the range of about 2700 to 5000° F. in a reaction zone laterally confined by a gas permeable surface through which a cooling gas is continuously passed to maintain the temperature of said surface below about 1500° F., reaction products comprising calcium carbide and carbon monoxide are cooled and solid calcium carbide is separated.

Calcium carbide is usually prepared by heating a mixture of pulverized lime and coke in an electric furnace. The electric furnace is employed to provide the necessary high temperature for large scale operation. Recently attempts have been made to produce calcium carbide by processes where in the high temperature required is generated by reacting carbon and oxygen in contact with lime in a shaft furnace. U.S. Patent 2,738,256, issued to Wilhelm Van Loon, March 13, 1956, describes a process in which a mixture of lumps of fuel and limestone is introduced into the top of a shaft furnace and oxygen is introduced through tuyeres to produce molten calcium carbide.

In accordance with this invention a carbonaceous solid and a calcareous solid are reacted with oxygen at high temperatures in a reaction system wherein solid reactants and reaction products are suspended and entrained in gaseous reactants and reaction products. The process results in concomitant production of calcium carbide and a gas comprising carbon monoxide.

In one embodiment of the process of this invention a gaseous feed suspension is formed comprising pulverulent unslaked lime and pulverulent coke in oxygen. Particles of lime and coke having average diameters up to several hundred microns may be suspended in oxygen by the well known fluidized solids handling technique. However, finely divided particles having average particle diameters below about 10 microns are preferred.

The feed dispersion comprising particles of lime and coke in oxygen is passed into a reaction zone autogenously maintained at a reaction temperature within the range of about 2700 to 5000° F. The lime, coke and oxygen react to form calcium carbide and gaseous carbon monoxide. The reaction zone is enclosed by a gas permeable surface through which a suitable cooling gas is passed. The reactants are maintained at reaction temperature for a time within the range of about 1 to 5 seconds to effect conversion to calcium carbide and carbon monoxide. The reaction products are then rapidly quenched to a temperature below 2700° F. and preferably below about 1700° F. wtih additional cooling gas. Advantageously carbon monoxide produced as a product of the reaction may be recycled to provide the cooling gas passed through the permeable surface, the quenching gas, or both. The cooled products are passed to conventional gas-solids separating equipment, for example, cyclone separators, electrostatic precipitators or filters. Solid calcium carbide, in finely divided form, and gaseous carbon monoxide are separately withdrawn as products. Advantageously, the reaction products may be cooled by contacting wtih oxygen, lime, or carbon feed thereby effecting heat economies by preheating the process feed.

Calcareous oxides and carbonates are suitable for use in the process of this invention, for example, limestone, dolomite, and unslaked lime all of which may be referred to for convenience as "lime." Carbonaceous solids suitable for use in the process of this invention include, for example, coke and other carbon-containing solids which are predominantly carbon and contain little or no hydrogen. The term coke is used herein for convenience to refer to carbonaceous compounds generally which contain little or no hydrogen.

Since a large part of the coke and oxygen passed to the reaction zone is employed to supply energy thereto, it is desirable to exclude diluents from the reaction zone and it is, therefore, preferable that the oxygen-containing gas be of high purity. Commercially pure oxygen comprising about 95 percent oxygen is readily obtained by the rectification of air and is a preferred source of oxygen for the process of this invention.

The invention will be better understood from the more detailed description hereinafter which refers to the accompanying drawings.

FIGURE 1 is a graphical representation of the temperatures which may prevail in a reactor and reaction zone constructed in accordance with the process of this invention in comparison with the temperature prevailings in a normally cooled reactor operated at the same reaction temperature.

FIGURE 2 is a diagrammatic illustration of one form of the process of this invention.

FIGURE 3 is a diagrammatic illustration of another form of the process of this invention adapted to effect heat economies by direct contact heat exchange between effluent products and feed streams.

FIGURE 4 is a drawing of a portion of a reaction zone lined wtih porous refractory.

FIGURE 5 is a drawing of a portion of a reaction zone lined with a perforated metal liner.

The reaction of lime, coke and oxygen to form calcium carbide and carbon monoxide is effected at temperatures within the range of about 2700 to 5000° F. It is preferred to employ a temperature within the range of about 3000 to 4000° F. A formidable problem encountered in conducting reactions at the foregoing temperatures is the selection of materials of construction. Ordinary refractory linings fail at temperatures below those herein employed. In accordance with the process of this invention the reaction zone is enclosed by a porout surface through which cooling fluid is continuously passed. The aforesaid porous surface may comprise a cylinder of perforated porous metal or a porous refractory material, for example, Alundum, silicon carbide, spinel or graphite, containing a multitude of tortuous passageways through which cooling fluid may be passed inwardly to form a boundary to the reaction zone. Gas or liquid at a temperature substantially below the reaction temperature is passed through the porous surface to maintain the surface temperature below about 1500° F. Although it will be obvious that many liquids and gases may be used as cooling fluid, it is preferred to employ a reactant or product as cooling fluid. For example, a portion of the carbon monoxide product may be recycled through cooling equipment and then through the porous reaction zone surface thereby avoiding dilution of the product gas. The temperature of the reaction zone effluent is reduced to a level below about 1700° F. before introduction into conventional materials handling squipment.

The method of film cooling the wall of the reaction zone with a gaseous reactant or product is an important feature of the process of this invention. Cooling fluid is continuously passed through a porous wall from the cold side into the reaction zone. This flow of fluid at the hot surface forms a blowing boundary layer having two to three times the thickness of a normal gas boundary layer. Because of the low heat transfer coefficient through the gaseous boundary layer, this thickening of the boundary layer materially reduces the amount of heat transfer to the reactor walls. By continuously passing through the wall, the cooling fluid transfers heat counter-current to the normal flow of heat to the extent of the sensible heat absorbed by the cooling gas as it passes through the wall and boundary layer.

The temperature gradient prevailing in a reaction zone wall employing film cooling as compared with the temperature gradient prevailing in the walls of reaction zone without film cooling is shown in FIGURE 1. It is evident that the temperature differential across the blowing boundary layer of a film cooled reactor wall results in significantly reduced temperature of the refractory surface and the steel shell. It will be noted that since the blowing boundary layer is about three times the thickness of the normal boundary layer, the temperature differential through the boundary layer is about three times as great for a film cooled reaction zone as for a normally cooled reaction zone.

The reaction zone is designed to provide a reaction time within the range of about 1 to 5 seconds. The products are cooled through turbulent mixing by introducing additional cooling gas to reduce the temperature of the reactants to a temperature below 2700° F. and preferably below about 1700° F. The cooling gas may be introduced in part through a portion of the permeable surface or may be introduced through one or more ports in the walls of the reaction zone. The cooling gas may comprise any non-reactive gas and advantageously comprises carbon monoxide separated from the products.

An important feature of this invention is that it affords a method of conducting extremely high temperature reactions at superatmospheric pressures up to 500 pounds per square inch or higher. In the manufacture of calcium carbide and carbon monoxide at temperatures of 2700 to 5000° F. according to the process of this invention, the foregoing temperatures prevail throughout the reactants within the reaction zone but the highest temperature to which the apparatus enclosing the reaction zone is subjected is about 1500° F. or less. In one embodiment of the process of this invention, the apparatus employed comprises a porous refractory cylinder disposed within a steel shell of greater diameter. The annulus between the refractory and shell forms a plenum into which a cooling gas is continuously introduced. Gas passes through the porous refractory and maintains the inner surface of the reaction zone line below about 1500° F. The steel outer shell is relatively cold. The pressure within the reaction zone may be maintained at any desired pressure without imposing severe pressure stress upon the refractory reactor wall since the reactor pressure is balanced by a slightly higher pressure of the cooling gas in the surrounding plenum. The differential pressure across the porous liner is only that necessary to produce flow of cooling gas and may vary from about 10 inches of water to about 15 pounds per square inch. Since the steel shell forming the outer surface is cold, conventional design may be employed to withstand the cooling gas pressure within the plenum. It is advantageous to produce calcium carbide and carbon monoxide by the process of this invention at pressures of about 100 to 500 pounds per square inch effecting economies within the process and making product carbon monoxide available under pressure for use in other processes. In particular, operation under superatmospheric pressure reduces equipment size and reduces the volume of gases which are recycled.

An advantage of the process of this invention is that calcium carbide and carbon monoxide are concomitantly produced by the reaction of a carbonaceous solid, a calcareous solid and oxygen.

Another advantage of the process of this invention is that the reactants are maintained in the form of a dispersion of finely divided particles in gas thereby effecting efficient contact and high reaction rates.

Another advantage of the process of this invention is that the flow type reaction zone and associated process equipment are small resulting in a low capital investment for a given calcium carbide capacity.

Another advantage of the process of this invention is that a highly uniform product free of unconsumed reactants is produced.

Another advantage of the process of this invention is that extremely high temperature reaction conditions can be maintained at superatmospheric pressures up to 500 pounds per square inch or higher.

Another advantage of the process of this invention is that carbon monoxide may be produced at superatmospheric pressures for use in subsequent superatmospheric pressure processing without compression.

The drawings, FIGURES 2, 3, 4, and 5, diagrammatically illustrate several features of the process and apparatus of this invention. Although the drawings illustrate arrangements of apparatus in which the process of this invention may be practiced, it is not intended to limit the invention to the particular apparatus or material described.

Referring to FIGURE 2, pulverulent coke in hopper 10 is transferred through line 11 at a rate controlled by valve 12 and discharged into reactor feed line 13. Pulverulent lime in hopper 15 is withdrawn through line 16 at a rate controlled by valve 17 and discharged into reactor inlet line 13. Alternatively, the coke and lime may be premixed in desired proportion and introduced through a single hopper and feed line system. The coke and lime are entrained by gaseous oxygen introduced through line 20 at a rate controlled by valve 21 in reactor inlet line 13. The suspension of lime and coke in oxygen is introduced into reaction zone 25 which is maintained at an autogenous temperature within the range of about 2700 to 5000° F. Reaction zone 25 is formed by reactor wall 26 which comprises a porous material. Reactor wall 26 is supported within reactor shell 27 by supports 28a, 28b, 28c and reactor shell partition 29. Cooling gas is introduced into plenum 34 through lines 35 and 36 at a rate controlled by valve 37. Cooling gas penetrates reactor wall 26 and maintains a film of cool gas on the inner surface of wall 26 to maintain the surface temperature of wall 26 below about 2000° F. The reactants pass through reaction zone 25 at a rate such that after a reaction time of about 1 to 5 seconds they enter cooling zone 40. Cooling zone 40 is formed by an extension of the reactor wall 26 which is perforated as indicated at 41. Cooling gas introduced through lines 45 and 46 at a rate controlled by valve 47 pass into plenum 48 and through perforations 41 to cool the reactants in cooling zone 40 to a temperature below about 2700° F. Cooled reaction products comprising solid calcium carbide and carbon monoxide pass from reactor cooling zone 40 through line 50 to cyclone separator 51 wherein the solid calcium carbide is separated from the gaseous carbon monoxide. Product calcium carbide is withdrawn through line 52. Gaseous carbon monoxide is withdrawn from cyclone separator 51 through line 53 and cooled in cooler 54. Cooler 54 may comprise a heat exchanger in which one of the reactants is preheated or may comprise a steam generator for the generation of steam useful in ancillary processing. A portion of the cooled carbon monoxide from line 55 is withdrawn as product through line 56 and valve 57. A portion of the carbon monoxide is recycled through lines 60 and 61 by compressor 62 to supply the cooling gas passed through lines 35 and 45.

FIGURE 3 illustrates one preferred embodiment of the present invention. Oxygen in line 101 is heated to about 400° F., in heat exchanger 102 and passed through line 103 to film cooled reactor 104. A mixture of lime and coke preheated to a temperature of about 1200° F. in line 105 is passed to film cooled reactor 104. Film cooled reactor 104 comprises a steel shell, the lower portion of which is lined with a porous refractory 107 and the upper portion of which is lined with a perforated metal liner 108 details of which are described with reference to FIGURES 4 and 5 respectively. The coke, lime and oxygen react in reactor 104 to produce carbon monoxide and calcium carbide at a reaction temperature of about 2700° F. As the reactants pass through reactor 104 they are cooled by cooling gas introduced through line 110, porous refractory 107, line 110a and perforated liner 108 so that the products of reaction leaving reactor 104 through line 111 are at a temperature of about 1700° F. Products in line 111 are passed to separator 112 which is also provided with film cooled perforated metal walls through which coolant is added by way of line 113. Solid calcium carbide is withdrawn through line 114 and gaseous products are withdrawn through line 115. Solid calcium carbide is cooled in cooler 120 and discharged to product storage through line 121.

A portion of the effluent product carbon monoxide from separator 112 at approximately 1500° F. is discharged through lines 115 and 122 to heat exchanger 102 to provide preheat for the aforesaid oxygen stream. Effluent carbon monoxide product is discharged from heat exchanger 102 through lines 123 and 124.

A portion of the carbon monoxide in line 115 is passed through line 125 to preheater 126. Pulverulent coke in hopper 127 and pulverulent lime in hopper 128 are introduced into hopper 129 which serves as a pressure lock and as a mixing vessel. The coke and lime are mixed in hopper 129 by fluidizing the mass of solids therein with gas introduced through line 130 and withdrawn through line 131. The pressure is increased to the pressure prevailing in preheater 126 of about 500 pounds per square inch gauge and the mixed coke and lime are then discharged from vessel 129 into preheater 126. After discharge of its contents, vessel 129 is vented through line 132 preparatory to receiving fresh charges of coke and lime from hoppers 127 and 128. In preheater 126, the mixture of coke and lime moves downwardly in the form of a moving bed of unfluidized particles countercurrently to the rising gases. As the solids pass downwardly through preheater 126 they are increased from storage temperature to a temperature of about 1200° F. Hot coke from the bottom of preheater 126 is withdrawn through line 135 and discharged by solids pump 136 through line 137 to feed line 105. Carbon monoxide transfer gas is supplied to solids pump 136 through line 140. The carbon monoxide introduced to preheater 126 at a temperature of about 1500° F. is cooled by countercurrent contact with the solids in preheater 126 and is discharged through line 141 at a temperature of about 500° F.

Gas from preheater 126 in line 141 and gas from hopper 129 in line 131 are combined and passed to separator 142 for separation of any entrained particles. Separated solids are withdrawn through line 143 and are transferred by solids pump 144 through line 145 to solids feed line 105. Carbon monoxide transfer gas is supplied to solids pump 144 through line 146. Gas from separator 142 is withdrawn through line 150 and a portion is recycled through lines 151 and 153 by compressor 152 to supply the transfer gas in lines 146 and 140 and the cooling gas in lines 110 and 113. Although heat exchange by countercurrent contacting of feed solids and product gas in preheater 126 has been described in terms of the use of a single bed of downwardly moving solids, alternatively, countercurrent contacting may be effected using a plurality of fluidized beds of solids. The remaining carbon monoxide gas is discharged through product gas line 124.

FIGURE 4 is a drawing of a portion of the film cooled reaction zone wall of reactor 104 shown in FIGURE 3. In FIGURE 4 the porous refractory is indicated as 107 and the steel shell of reaction zone 104 is identified as 170. Passageways 171, 171a, 171b etc., are formed within porous refractory 107 so that no portion of the surface exposed to the reaction zone is more than a few inches from a passageway. Passageways 171, 171a, 171b, etc., are interconnected by lateral distribution passageways 172, 172a, 172b, etc. Coolant inlet line 110 passes through steel shell 170 and discharges coolant into passageway 171b. Coolant from passageway 171b, flows through internal distribution passageways 172, 172a, 172b, etc., and passageways 171, 171a, etc., to all parts of refractory 107. The coolant passes through the porous refractory 107 and emerges from the surface to form a blowing boundary layer which forces the reactants away from the refractory surface.

FIGURE 5 shows a portion of the wall of reactor 104 employing a perforated metal liner for film cooling of the inner reactor wall. The perforated metal liner is indicated as 108 and the steel shell of the reactor 104 is indicated as 170. The perforated metal liner 108 is supported within the steel shell 170 by liner supports 180. Coolant introduced through line 110a flows into the plenum formed by the perforated metal liner 108 and steel shell 170. Coolant gas from the plenum flows through perforations 181 to form a blowing boundary layer on the inner surface of perforated metal liner 108. This blowing boundary layer forces the hot reactants away from the surface of liner 108. In order to achieve substantial cooling of the reactants, the coolant is passed through perforations 181 at a high velocity forming jets of coolant. The resultant jet mixing effects rapid reduction of the temperature of the reactants.

The following example illustrates the concomitant production of calcium carbide and carbon monoxide by the process of this invention.

Petroleum coke is calcined to reduce the volatile content to less than 0.5 percent. Calcined coke is ground to a particle range such that 100 percent passes a 48 mesh Tyler standard screen and 75 percent passes a 200 mesh screen. Lime is pulverized to a particle size such that 90 percent passes a 100 mesh screen. Coke and lime particles at a rate of about 5.9 pounds of coke per pound of lime are entrained in a stream of commercially pure oxygen to form a solid in gas suspension comprising about 0.093 pound of solid particles per cubic foot of gas.

The suspension thus formed is introduced into a reaction zone which is maintained at an autogenous temperature of 3990° F. by the reaction of the coke, oxygen, and lime. The reaction zone is enclosed by a porous graphite wall through which cooling gas is continuously passed maintaining the surface temperature of the wall at 1000° F. The cooling gas consists of a recycle stream of carbon monoxide product which is cooled to about 140° F. before passing to the plenum surrounding the porous reactor wall.

Effluent products from the reaction zone comprising calcium carbide suspended in carbon monoxide are contacted with additional cooling gas to reduce the temperature of the combined stream to 1700° F. The product suspension is passed to a cyclone separator from which particulate calcium carbide and gaseous carbon monoxide of about 98 percent purity are separately withdrawn. Calcium carbide is produced at a rate of 1.12 pounds per pound of lime charged. Separated carbon monoxide is passed through heat exchangers for recovery of useful heat and is cooled to 140° F. A portion of the cooled carbon monoxide is recycled to provide process cooling gas and the remaining carbon monoxide is withdrawn as product at a rate of about 10,000 cubic feet per pound of calcium carbide produced.

Obviously, many modifications and variations of the invention as hereinbefore set forth may be made without

I claim:

1. In a process for the manufacture of calcium carbide by reaction of lime and carbonaceous solid at elevated temperature maintained by partial combustion of carbonaceous solid, the improvement which comprises passing coke and lime in admixture with oxygen into an unpacked reaction zone laterally confined by a gas permeable surface comprising a porous refractory; reacting said coke, lime and oxygen at an autogenous temperature within the range of about 3000 to 5000° F. wherein said solid particles are suspended and entrained in dispersed form in oxygen and resulting gaseous reaction products and reacted while in suspension to form calcium carbide and carbon monoxide; passing carbon monoxide cooling gas recovered as a product of said reaction through said gas permeable surface inwardly into said reaction zone effective to increase the thickness of the gas boundary layer on said surface and to maintain the temperature of said surface below about 1500° F.; discharging reaction products comprising calcium carbide and carbon monoxide from said reaction zone; separating calcium carbide and carbon monoxide from one another from said reaction products; cooling said separated carbon monoxide; and passing resulting cooled carbon monoxide to the outside of said gas permeable surface of the reaction zone as said cooling gas.

2. A process according to claim 1 wherein cooled, separated carbon monoxide is mixed with said hot products discharged from said reaction zone in an amount effecting cooling of said products to a temperature below about 1700° F.

3. A process according to claim 1 wherein said carbon monoxide is separated from said reaction products at substantially reaction temperature and passed into contact with lime and carbonaceous solid prior to introduction of said lime and carbonaceous solid into said reaction zone.

References Cited in the file of this patent

UNITED STATES PATENTS

| | | |
|---|---|---|
| 2,431,632 | Brandt | Nov. 25, 1947 |
| 2,686,819 | Johnson | Aug. 17, 1954 |
| 2,778,716 | Bagley | Jan. 22, 1957 |
| 2,794,706 | Loon et al. | June 4, 1957 |